United States Patent
Thackston et al.

(10) Patent No.: US 11,110,603 B2
(45) Date of Patent: Sep. 7, 2021

(54) SYSTEMS AND METHODS FOR NAÏVE PHYSICS FOR CONTACT AND CONTACT-AWARENESS IN ROBOTIC TELEOPERATION

(71) Applicant: Toyota Research Institute, Inc., Los Altos, CA (US)

(72) Inventors: Allison Thackston, San Jose, CA (US); Sam Zapolsky, San Francisco, CA (US); Katarina Bouma, Palo Alto, CA (US); Laura Stelzner, Mountain View, CA (US); Ron Goldman, Los Altos, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 204 days.

(21) Appl. No.: 16/149,769

(22) Filed: Oct. 2, 2018

(65) Prior Publication Data

US 2020/0101610 A1 Apr. 2, 2020

(51) Int. Cl.
   *B25J 9/16* (2006.01)
(52) U.S. Cl.
   CPC ............. *B25J 9/1666* (2013.01); *B25J 9/163* (2013.01); *B25J 9/1605* (2013.01); *B25J 9/1612* (2013.01); *B25J 9/1653* (2013.01); *B25J 9/1697* (2013.01)
(58) Field of Classification Search
   CPC ...... B25J 9/1666; B25J 9/1605; B25J 9/1612; B25J 9/1653; B25J 9/1697
   See application file for complete search history.

(56) References Cited

U.S. PATENT DOCUMENTS

| | | | |
|---|---|---|---|
| 6,353,814 B1 | 3/2002 | Weng | |
| 7,707,001 B2 | 4/2010 | Obinata et al. | |
| 7,865,267 B2 | 1/2011 | Sabe et al. | |
| 8,639,644 B1 | 1/2014 | Hickman et al. | |
| 9,605,952 B2 | 3/2017 | Rose et al. | |
| 2015/0134114 A1* | 5/2015 | Tsusaka | B25J 13/085 700/257 |
| 2015/0248116 A1* | 9/2015 | Kawaguchi | B25J 9/1687 700/245 |
| 2018/0050451 A1* | 2/2018 | Takanishi | B25J 9/1653 |
| 2018/0143645 A1 | 5/2018 | Lee et al. | |
| 2019/0108396 A1* | 4/2019 | Dal Mutto | G06T 7/174 |
| 2020/0078952 A1* | 3/2020 | Bell | B25J 9/163 |

FOREIGN PATENT DOCUMENTS

| | | |
|---|---|---|
| JP | 2007-316799 A | 12/2007 |
| WO | 2016/040862 A2 | 3/2016 |

OTHER PUBLICATIONS

Shan Luo et al., "Robotic Tactile Perception of Object Properties: A Review", Elsevier, arXiv:1711.03810v1 [cs.RO], Nov. 10, 2017, https://arxiv.org/pdf/1711.03810.pdf, pp. 1-17.

* cited by examiner

*Primary Examiner* — Rachid Bendidi
(74) *Attorney, Agent, or Firm* — Dinsmore & Shohl LLP

(57) ABSTRACT

A method includes detecting an object in a real environment of a robot. The method further includes inferring an expected property of the object based upon a representation of the object within a representation of the real environment of the robot. The method also includes sensing, via a sensor of the robot, a presently-detected property of the object in the real environment corresponding to the expected property. The method still further includes detecting a conflict between the expected property of the object and the presently-detected property of the object.

14 Claims, 11 Drawing Sheets

SYSTEMS AND METHODS FOR NAÏVE PHYSICS FOR CONTACT AND CONTACT-AWARENESS IN ROBOTIC TELEOPERATION

TECHNICAL FIELD

The present application generally relates to teleoperative robot control and, more particularly, providing a virtual representation of an environment corresponding to a robot's actual environment during teleoperation of a robot.

BACKGROUND

Users may teleoperatively control remote robots to perform a variety of tasks. Remote teleoperative users of robots may be provided virtual representations of objects within a virtual world that the users experience while remotely controlling such robots. These virtual objects may correspond to real-world objects that these robots encounter when traversing the real world to which the virtual world corresponds. However, conflicts may exist between what is presented to users and what robots detect, which can make it more difficult for such users to control their robots.

Accordingly, a need exists to improve the relationship between virtual representations of objects and their detected real-world counterparts.

SUMMARY

A method includes detecting an object in a real environment of a robot. The method also includes inferring an expected property of the object based upon a representation of the object within a representation of the real environment of the robot. The method further includes sensing, via a sensor of the robot, a presently-detected property of the object in the real environment corresponding to the expected property. The method also further includes detecting a conflict between the expected property of the object and the presently-detected property of the object.

In another embodiment, a system includes a robot comprising a sensor configured to output a signal. The system also includes a processor configured to sense a presently-detected property of an object in a real environment of the robot based on the signal output by the sensor, to infer an expected property of the object based upon a representation of the object within a representation of the real environment of the robot, and to detect a conflict between the expected property of the object and the presently-detected property of the object. The presently-detected property corresponds to the expected property.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to a user teleoperating a robot. More specifically, the virtual representation of the environment that is presented to the user may have conflicts or discrepancies as compared with the actual (i.e., detected) environment as detected by the robot. For example, the user may see an object within the virtual environment having a pose/orientation, where the virtual environment represents the robot's actual environment based upon data that was previously acquired by a scan of the environment. The virtual object in the virtual environment may have a variety of attributes, such as its pose and weight. However, as the user directs the robot to pick up the object, conflicts or discrepancies may become apparent such that the actual object may have a different pose and a different weight as compared to the virtual object presented to the user. As the robot detects these discrepancies, the pose attribute and the weight attribute may be updated accordingly enabling such robots to overcome problems associated with the existence of such conflicts and discrepancies. Various embodiments of conflict reconciliation for teleoperated robots are described in detail below.

Figure 1:
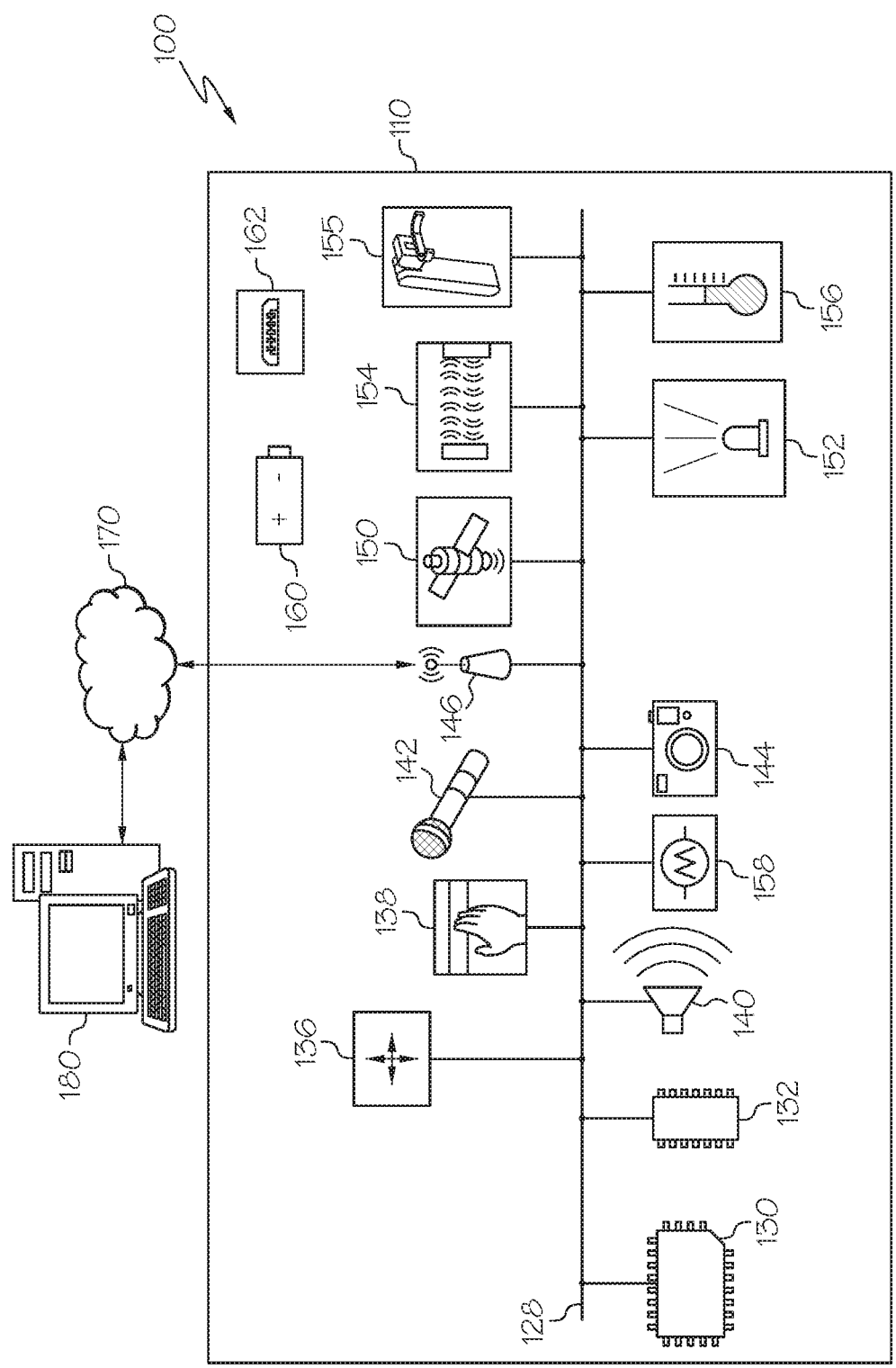
FIG. 1 is a block diagram illustrating hardware utilized in one or more robots for implementing various processes and systems, according to one or more embodiments shown and described herein.

Referring now to FIG. 1, example components of one embodiment of a robot 100 are schematically depicted. The robot 100 includes a housing 110, a communication path 128, a processor 130, a memory module 132, an inertial measurement unit 136, an input device 138, an audio output device 140 (e.g., a speaker), a microphone 142, a camera 144, network interface hardware 146, a location sensor 150, a light 152, a proximity sensor 154, one or more arms 155, a temperature sensor 156, a mobility actuator 158, a battery 160, and a charging port 162. The components of the robot 100 other than the housing 110 may be contained within or mounted to the housing 110. The various components of the robot 100 and the interaction thereof will be described in detail below.

Still referring to FIG. 1, the communication path 128 may be formed from any medium that is capable of transmitting a signal such as, for example, conductive wires, conductive traces, optical waveguides, or the like. Moreover, the communication path 128 may be formed from a combination of mediums capable of transmitting signals. In one embodiment, the communication path 128 comprises a combination of conductive traces, conductive wires, connectors, and buses that cooperate to permit the transmission of electrical data signals to components such as processors, memories, sensors, input devices, output devices, and communication devices. Accordingly, the communication path 128 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 128 communicatively couples the various components of the robot 100. As used herein, the term "communicatively coupled" means that coupled components are capable of exchanging data signals with one another such as, for example, electrical signals via conductive medium, electromagnetic signals via air, optical signals via optical waveguides, and the like.

The processor 130 of the robot 100 may be any device capable of executing machine-readable instructions. Accordingly, the processor 130 may be a controller, an integrated circuit, a microchip, a computer, or any other computing device. The processor 130 is communicatively coupled to the other components of the robot 100 by the communication path 128. Accordingly, the communication path 128 may communicatively couple any number of processors with one another, and allow the components coupled to the communication path 128 to operate in a distributed computing environment. Specifically, each of the components may operate as a node that may send and/or receive data. While the embodiment depicted in FIG. 1 includes a single processor 130, other embodiments may include more than one processor.

Still referring to FIG. 1, the memory module 132 of the robot 100 is coupled to the communication path 128 and communicatively coupled to the processor 130. The memory module 132 may comprise RAM, ROM, flash memories, hard drives, or any non-transitory memory device capable of storing machine-readable instructions such that the machine-readable instructions can be accessed and executed by the processor 130. The machine-readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable instructions and stored in the memory module 132. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 1 includes a single memory module 132, other embodiments may include more than one memory module.

The inertial measurement unit 136, if provided, is coupled to the communication path 128 and communicatively coupled to the processor 130. The inertial measurement unit 136 may include one or more accelerometers and one or more gyroscopes. The inertial measurement unit 136 transforms sensed physical movement of the robot 100 into a signal indicative of an orientation, a rotation, a velocity, or an acceleration of the robot 100. The operation of the robot 100 may depend on an orientation of the robot 100 (e.g., whether the robot 100 is horizontal, tilted, and the like). Some embodiments of the robot 100 may not include the inertial measurement unit 136, such as embodiments that include an accelerometer but not a gyroscope, embodiments that include a gyroscope but not an accelerometer, or embodiments that include neither an accelerometer nor a gyroscope.

Still referring to FIG. 1, one or more input devices 138 are coupled to the communication path 128 and communicatively coupled to the processor 130. The input device 138 may be any device capable of transforming user contact into a data signal that can be transmitted over the communication path 128 such as, for example, a button, a switch, a knob, a microphone or the like. In some embodiments, the input device 138 includes a power button, a volume button, an activation button, a scroll button, or the like. The one or more input devices 138 may be provided so that the user may interact with the robot 100, such as to navigate menus, make selections, set preferences, and other functionality described herein. In some embodiments, the input device 138 includes a pressure sensor, a touch-sensitive region, a pressure strip, or the like. It should be understood that some embodiments may not include the input device 138. As described in more detail below, embodiments of the robot 100 may include multiple input devices disposed on any surface of the housing 110. In some embodiments an input device 138 may include force sensors to detect an amount of force being exerted by and/or upon the robot 100 and/or tactile sensors to provide a sense of touch.

The speaker 140 (i.e., an audio output device) is coupled to the communication path 128 and communicatively coupled to the processor 130. The speaker 140 transforms audio message data from the processor 130 of the robot 100 into mechanical vibrations producing sound. For example, the speaker 140 may provide to the user navigational menu information, setting information, status information, information regarding the environment as detected by image data from the one or more cameras 144, and the like. However, it should be understood that, in other embodiments, the robot 100 may not include the speaker 140.

The microphone 142 is coupled to the communication path 128 and communicatively coupled to the processor 130. The microphone 142 may be any device capable of transforming a mechanical vibration associated with sound into an electrical signal indicative of the sound. The microphone 142 may be used as an input device 138 to perform tasks, such as navigate menus, input settings and parameters, and any other tasks. It should be understood that some embodiments may not include the microphone 142.

Still referring to FIG. 1, the camera 144 is coupled to the communication path 128 and communicatively coupled to the processor 130. The camera 144 may be any device having an array of sensing devices (e.g., pixels) capable of detecting radiation in an ultraviolet wavelength band, a visible light wavelength band, or an infrared wavelength band. The camera 144 may have any resolution. The camera 144 may be an omni-directional camera, or a panoramic camera. In some embodiments, one or more optical components, such as a mirror, fish-eye lens, or any other type of lens may be optically coupled to the camera 144.

The network interface hardware 146 is coupled to the communication path 128 and communicatively coupled to the processor 130. The network interface hardware 146 may be any device capable of transmitting and/or receiving data via a network 170. Accordingly, network interface hardware 146 can include a wireless communication module configured as a communication transceiver for sending and/or receiving any wired or wireless communication. For example, the network interface hardware 146 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 146 includes hardware configured to operate in accordance with the Bluetooth wireless communication protocol. In another embodiment, network interface hardware 146 may include a Bluetooth send/receive module for sending and receiving Bluetooth communications to/from an interface device 180. The network interface hardware 146 may also include a radio frequency identification ("RFID") reader configured to interrogate and read RFID tags.

In some embodiments, the robot 100 may be communicatively coupled to an interface device 180 via the network 170. In some embodiments, the network 170 is a personal area network that utilizes Bluetooth technology to communicatively couple the robot 100 and the interface device 180. In other embodiments, the network 170 may include one or more computer networks (e.g., a personal area network, a local area network, or a wide area network), cellular networks, satellite networks and/or a global positioning system and combinations thereof. Accordingly, the robot 100 can be communicatively coupled to the network 170 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 1, as stated above, the network 170 may be utilized to communicatively couple the robot 100 with the interface device 180. As discussed in more detail below with respect to FIG. 3, the interface device 180 may include a tablet, mobile phone, a smartphone, a personal digital assistant, a camera, a dedicated mobile media player, a mobile personal computer, a wearable computing device (such as a headset for virtual reality or glasses for augmented reality), a desktop computer, a server, a laptop computer, an imaging device, and/or any other electronic device capable of being communicatively coupled with the robot 100. The interface device 180 may include one or more processors and one or more memories. The one or more processors can execute logic to communicate with the robot 100. The interface device 180 may be configured with wired and/or wireless communication functionality for communicating with the robot 100. In some embodiments, the interface device 180 may perform one or more elements of the functionality described herein, such as in embodiments in which the functionality described herein is distributed between the robot 100 and the interface device 180.

The location sensor 150 is coupled to the communication path 128 and communicatively coupled to the processor 130. The location sensor 150 may be any device capable of generating an output indicative of a location. In some embodiments, the location sensor 150 includes a global positioning system (GPS) sensor, though embodiments are not limited thereto. Some embodiments may not include the location sensor 150, such as embodiments in which the robot 100 does not determine a location of the robot 100 or embodiments in which the location is determined in other ways (e.g., based on information received from the camera 144, the microphone 142, the network interface hardware 146, the proximity sensor 154, the inertial measurement unit 136 or the like). The location sensor 150 may also be configured as a wireless signal sensor capable of triangulating a location of the robot 100 and the user by way of wireless signals received from one or more wireless signal antennas.

Still referring to FIG. 1, the light 152 is coupled to the communication path 128 and communicatively coupled to the processor 130. The light 152 may be any device capable of outputting light, such as, but not limited to, a light emitting diode, an incandescent light, a fluorescent light, or the like. Some embodiments include a power indicator light that is illuminated when the robot 100 is powered on. Some embodiments include an activity indicator light that is illuminated when the robot 100 is active or processing data. Some embodiments include an illumination light for illuminating the environment in which the robot 100 is located. Some embodiments may not include the light 152.

The proximity sensor 154 is coupled to the communication path 128 and communicatively coupled to the processor 130. The proximity sensor 154 may be any device capable of outputting a proximity signal indicative of a proximity of the robot 100 to another object. In some embodiments, the proximity sensor 154 may include a laser scanner, a capacitive displacement sensor, a Doppler effect sensor, an eddy-current sensor, an ultrasonic sensor, a magnetic sensor, an optical sensor, a radar sensor, a lidar sensor, a sonar sensor, or the like. Some embodiments may not include the proximity sensor 154, such as embodiments in which the proximity of the robot 100 to an object is determine from inputs provided by other sensors (e.g., the camera 144, the speaker 140, etc.) or embodiments that do not determine a proximity of the robot 100 to an object. One or more arms 155 may be utilized and feature any number of joints, effectuators, force sensors, tactile sensors, and the like.

The temperature sensor 156 is coupled to the communication path 128 and communicatively coupled to the processor 130. The temperature sensor 156 may be any device capable of outputting a temperature signal indicative of a temperature sensed by the temperature sensor 156. In some embodiments, the temperature sensor 156 may include a thermocouple, a resistive temperature device, an infrared sensor, a bimetallic device, a change of state sensor, a thermometer, a silicon diode sensor, or the like. Some embodiments of the robot 100 may not include the temperature sensor 156.

The mobility actuator 158 is coupled to the communication path 128 and communicatively coupled to the processor 130. As described in more detail below, the mobility actuator 158 may be or otherwise include a motorized wheel assembly that includes one or more motorized wheels that are driven by one or more motors. In other embodiments, the mobility actuator 158 may include one or more limbs (with or without joints) such as legs, arms, or anything else that may be utilized by the robot 100 for walking, crawling, swimming, self-pulling/dragging across a surface, etc. In some embodiments, limbs may include webbing or any suitable configuration and/or material that may utilized for travelling within and/or under water. In other embodiments the mobility actuator 158 may include sails, propellers, and/or turbines for underwater mobility. In still other embodiments, the mobility actuator 158 may include wings, propellers, and/or turbines for air travel/flight, which may include hovering.

The processor 130 may provide one or more drive signals to the mobility actuator 158 to, for example, actuate motorized wheels in a motorized wheel assembly such that the robot 100 travels to a desired location. This may be a location that the user wishes to acquire environmental information (e.g., the location of particular objects within at or near the desired location), or a location from which the robot 100 may manipulate an object as desired by the user.

Still referring to FIG. 1, the robot 100 is powered by the battery 160, which is electrically coupled to the various electrical components of the robot 100. The battery 160 may be any device capable of storing electric energy for later use by the robot 100. In some embodiments, the battery 160 is a rechargeable battery, such as a lithium-ion battery or a nickel-cadmium battery. In embodiments in which the battery 160 is a rechargeable battery, the robot 100 may include the charging port 162, which may be used to charge the battery 160. Some embodiments may not include the battery 160, such as embodiments in which the robot 100 is powered the electrical grid, by solar energy, or by energy harvested from the environment. Some embodiments may not include the charging port 162, such as embodiments in which the apparatus utilizes disposable batteries for power.

Figure 2:
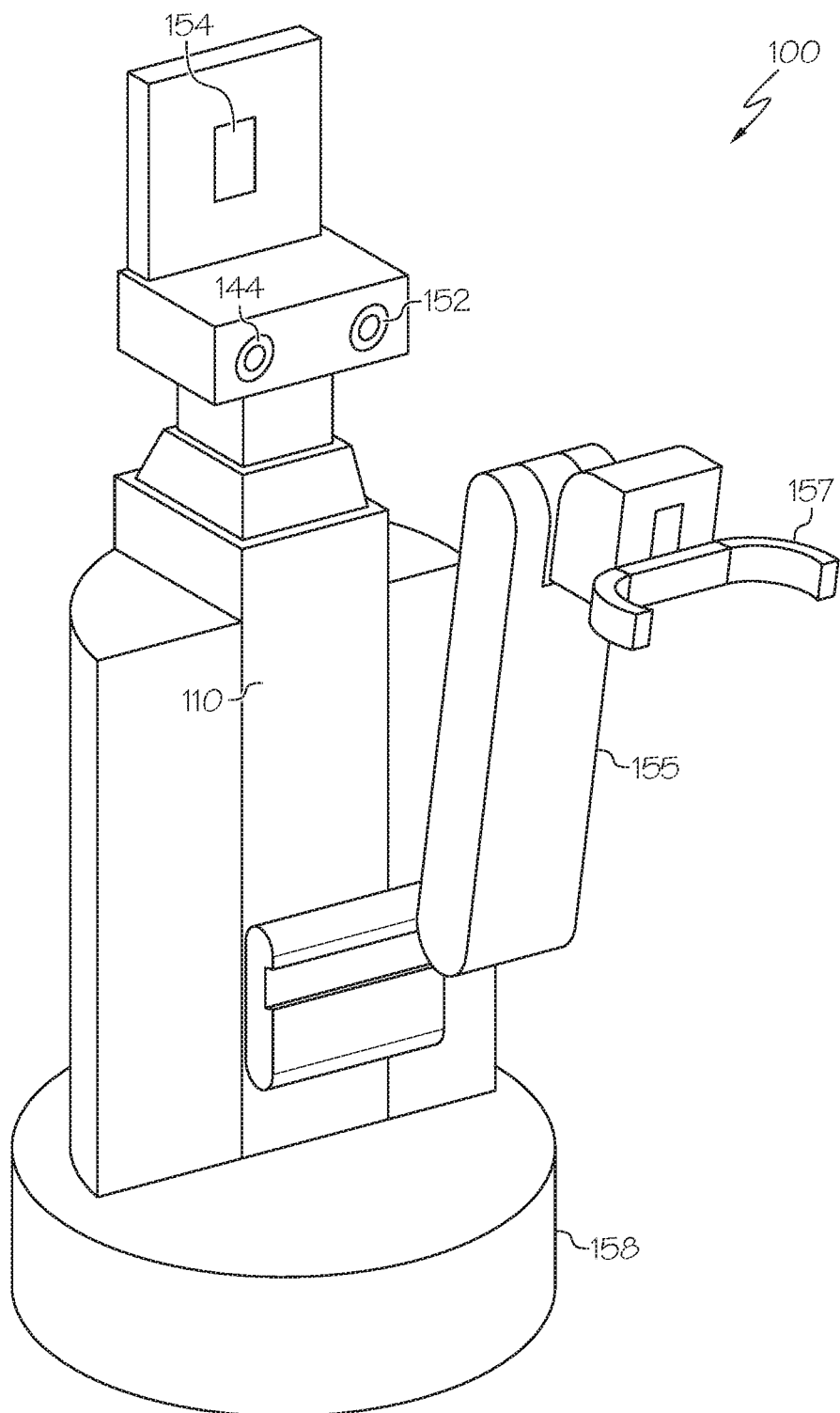
FIG. 2 schematically illustrates a top perspective view of an exemplary robot, according to one or more embodiments described and illustrated herein.

Referring now to FIG. 2, the physical configuration of the robot 100 is schematically illustrated. The robot 100 may be of any suitable size, height, weight, dimensions, etc. Generally, the robot 100 includes a housing 110, a camera 144, a light 152, and a base portion having a mobility actuator 158, which in this embodiment is a motorized wheel assembly. The robot 100 includes a proximity sensor 154 at a top portion of the robot 100 above the camera 144 and the light 152, though in other embodiments the proximity sensor 154 may be positioned at a different location. Any number of proximity sensors 154 may be provided. As described above with respect to FIG. 1, the proximity sensor 154 may generate one or more signals based on the presence of one or more objects. The proximity sensor(s) 154 may be used by the robot 100 to detect objects (e.g., anything with which the example robot 100 can interact) and/or avoid obstacles (e.g., people, furniture, stairs, walls, and the like) as it navigates within the environment, fully autonomously, partially autonomously, under user teleoperative control, or the like.

The robot 100 may feature one or more arms 155. In this embodiment the arm 155 utilizes an interaction effectuator 157 to interact with objects, such as picking them up. Any suitable type of arm 155 may be utilized, and may feature any suitable number, configuration, and/or type of interaction effectuators 157. It should be understood that the arrangement of the components depicted in FIG. 2 is for illustrative purposes only, and that embodiments are not limited thereto. As discussed herein, an arm 155 and/or interaction effectuator 157 may utilize force sensors, tactile sensors, and the like for physical detection of objects. Portions of the robot 100 may be made of a material that is substantially transparent to the wavelength of the radiation detected by the camera 144 (e.g., wavelengths within the visual spectrum). Any suitable number of cameras may be utilized. In some embodiments, the camera 144 is configured to capture omni-directional image data. For example, the camera 144 may rotate about an axis to capture image data about three-hundred and sixty degrees surrounding the robot 100. Further, the camera 144 may be configured to automatically tilt up and down and/or pan left and right to capture additional image data that would otherwise be out of view if the camera 144 did not tilt up and down.

Figure 3:
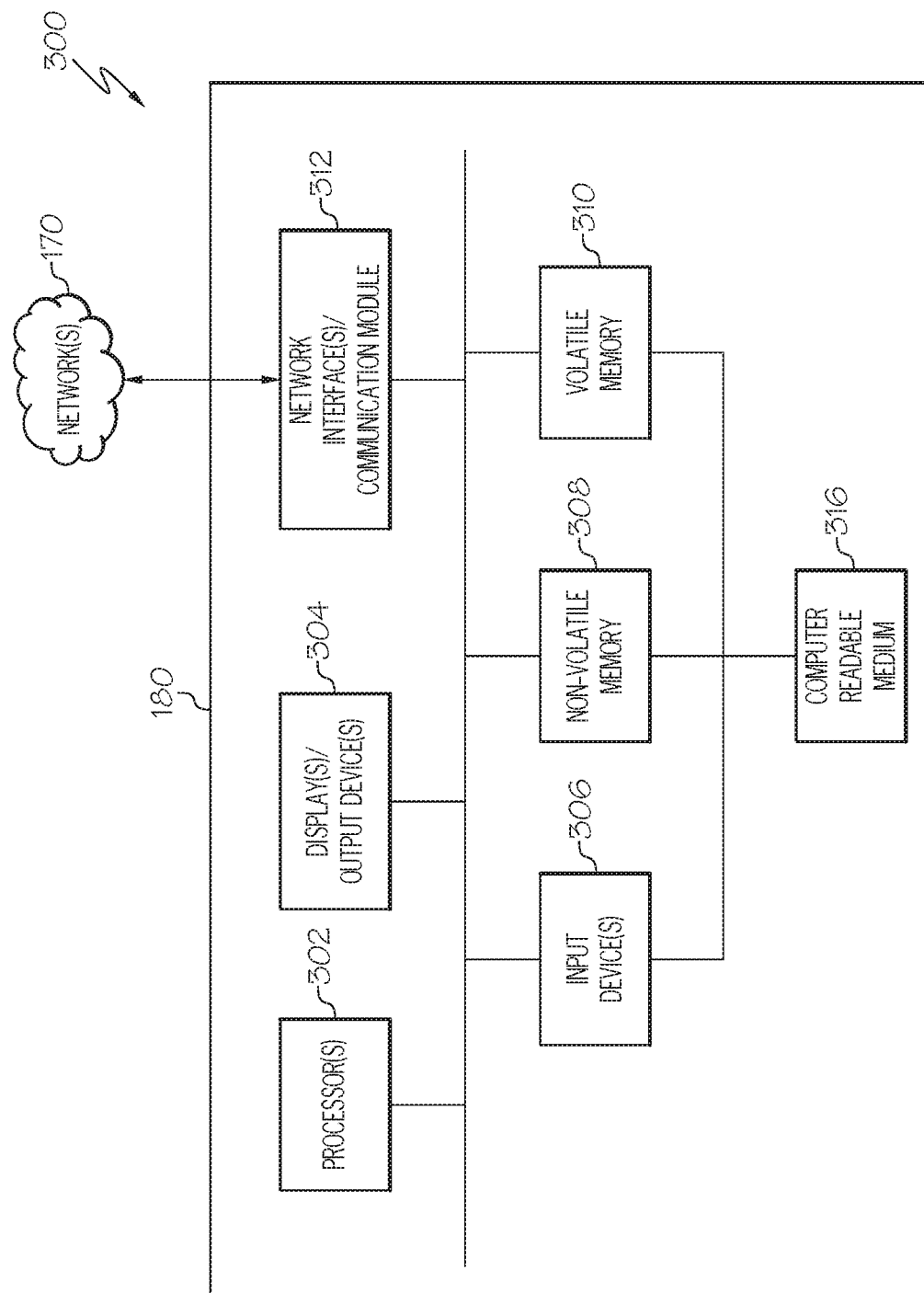
FIG. 3 is a block diagram illustrating computing hardware utilized in one or more devices for implementing various processes and systems, according to one or more embodiments shown and described herein.

Turning to FIG. 3, a block diagram illustrates an exemplary computing environment 300 through which embodiments of the disclosure can be implemented, such as, for example, in the interface device 180 depicted in FIG. 1. The interface device 180 described herein is but one example of a suitable computing device and does not suggest any limitation on the scope of any embodiments presented. Nothing illustrated or described with respect to the interface device 180 should be interpreted as being required or as creating any type of dependency with respect to any element or plurality of elements. In various embodiments, an interface device 180 may include, but need not be limited to, a tablet, mobile phone, a smartphone, a personal digital assistant, a camera, a dedicated mobile media player, a mobile personal computer, a wearable computing device (such as a headset for virtual reality or glasses for augmented reality), a desktop computer, a server, a laptop computer, an imaging device, and/or any other electronic device capable of being communicatively coupled with the robot 100. An interface device 180 in some embodiments may include an interface component as well as a control device. In an embodiment, the interface device 180 includes at least one processor 302 and memory (non-volatile memory 308 and/or volatile memory 310). The interface device 180 may include non-volatile memory 308 (ROM, flash memory, etc.), volatile memory 310 (RAM, etc.), or a combination thereof. In some embodiments, the at least one processor 302 is coupled to the non-volatile memory 308 and/or volatile memory 310. The interface device 180 may utilize, by way of non-limiting example, RAM, ROM, cache, fiber optics, EPROM/Flash memory, CD/DVD/BD-ROM, hard disk drives, solid-state storage, optical or magnetic storage devices, diskettes, electrical connections having a wire, any system or device that is of a magnetic, optical, semiconductor, or electronic type, or any combination thereof.

The interface device 180 can include one or more displays and/or output devices 304 such as monitors, speakers, headphones, projectors, wearable-displays, holographic displays, and/or printers, for example. An output device 304 may be any device capable of providing tactile feedback to a user, and may include a vibration device (such as in embodiments in which tactile feedback is delivered through vibration), an air blowing device (such as in embodiments in which tactile feedback is delivered through a puff of air), or a pressure generating device (such as in embodiments in which the tactile feedback is delivered through generated pressure). In some embodiments one or more output devices 304 may constitute an interface component.

The interface device 180 may further include one or more input devices 306 which can include, by way of example, any type of mouse, keyboard, disk/media drive, memory stick/thumb-drive, memory card, pen, joystick, gamepad, touch-input device, biometric scanner, voice/auditory input device, motion-detector, camera, scale, etc. In some embodiments one or more input devices 306 may constitute a control device.

A network interface 312 can facilitate communications over a network 314 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. The interface device 180 may include one or more network interfaces 312 to facilitate communication with one or more remote devices, which may include, for example, client and/or server devices. A network interface 312 may also be described as a communications module, as these terms may be used interchangeably. Network interface 312 can be communicatively coupled to any device capable of transmitting and/or receiving data via one or more networks 170, which may correspond to the network 170 in FIG. 1. In other embodiments different networks may be accessed to facility connectivity, such that network 170 need not be or even be in direct communication with the network 170 in FIG. 1, such as where one or more other networks may serve as intermediary networks. The network interface hardware 312 can include a communication transceiver for sending and/or receiving any wired or wireless communication.

For example, the network interface hardware 312 may include an antenna, a modem, LAN port, Wi-Fi card, WiMax card, mobile communications hardware, near-field communication hardware, satellite communication hardware and/or any wired or wireless hardware for communicating with other networks and/or devices.

A computer-readable medium 316 may comprise a plurality of computer readable mediums, each of which may be either a computer readable storage medium or a computer readable signal medium. A computer readable medium 316 may reside, for example, within an input device 306, non-volatile memory 308, volatile memory 310, or any combination thereof. A computer readable storage medium can include tangible media that is able to store instructions associated with, or used by, a device or system. A computer readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media exclude propagated signals and carrier waves.

Figure 4:
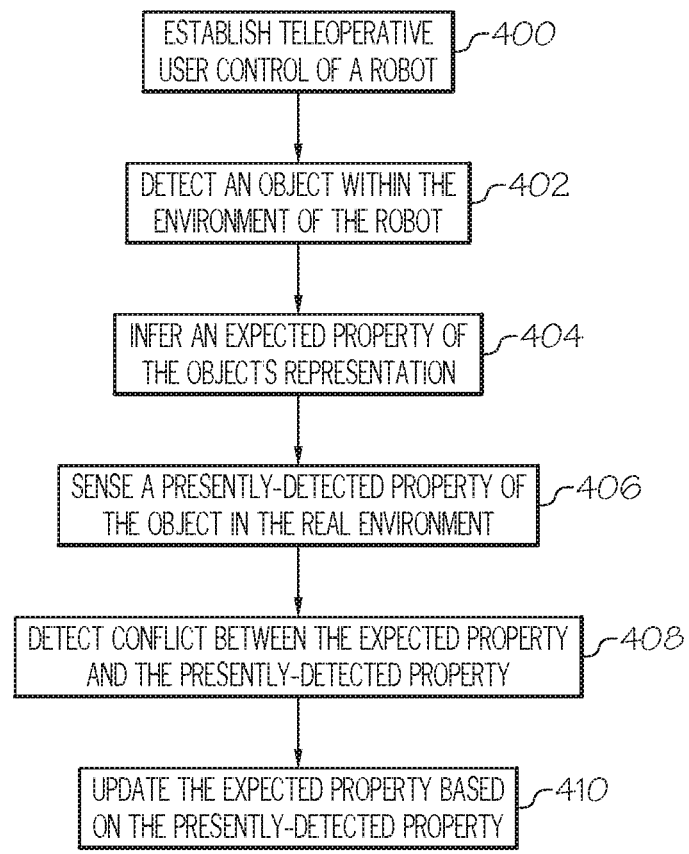
FIG. 4 illustrates a flowchart for updating a virtual object's expected property based upon a conflict between the expected property and a corresponding detected property of the detected object, according to one or more embodiments described and illustrated herein.

Turning to FIG. 4, a flowchart for updating a virtual object's expected property based upon a conflict between the detected property of the detected object and the expected property of the object is presented, according to one embodiment. At block 400, a teleoperative user's control of a robot may be established, such as through an input device and/or a control device (e.g. the interface device 180), along with an interface that may provide a virtual representation of an environment of a robot (e.g., a virtual representation displayed on a display of the one or more output devices of the interface device 180). User input/commands may include anything that the robot would be capable of performing, including by way of non-limiting example, forward movement, reverse movement, lateral movement, rotation, increasing/decreasing the robot's height, and/or utilizing anything the robot would use for manipulating objects (such as the interaction effectuator 157 depicted above with respect to FIG. 2). As discussed in more detail below with respect to FIGS. 6A-C, a robot may manipulate an object (such as grasping a coffee cup on a table).

The virtual representation/environment may utilize modeling data, which may be presented as one or more three-dimensional models of various aspects of the environment, such as rooms, walls, furniture, and the like. Virtual data may include a three-dimensional model of the environment presented to approximate what was previously recorded about the environment in which the robot presently operates. Such a three dimensional model may be a simplified version of the environment, such as where more prominent features (walls, large furniture, doorways, stairs) are provided without regard to other features (objects that are smaller, more portable, etc.). Any suitable level of detail may be utilized. In another example, a stored two dimensional image may be presented. One or more two-dimensional images representative of the robot's point of view in the environment may be utilized to approximate the environment. A view of the robot may be provided in the simulation, such as one or more robot arms 155 and/or effectuators 157 from a first-person view.

At block 402, an object may be detected within the actual environment of the robot. A robot may move within the environment and/or manipulate objects within the environment. An object may be anything with which a robot is capable of observing and/or physically interacting with. For example, detection may be done via a point cloud representation produced by one or more lidar sensors utilized by the robot. In other embodiments, any suitable type of data and/or sensor(s) (such as the proximity sensor 154 discussed above) may be utilized to obtain and produce a representation of the environment of the robot, which may be referred to as a virtual representation. Detection of the object may involve determining an object's location, its pose (i.e., which way the object faces), and the like.

At block 404, an expected property of the representation of the object detected at block 402 may be inferred or retrieved. In this embodiment, objects have attributes associated with them, which may include anything for which data can be utilized to describe an object, such as weight, color, temperature, texture, density, location, pose, and the like. As discussed below in more detail with respect to FIGS. 7A-C, a coffee cup may have a weight attribute value. In another example, a sealed container may have attribute values related to the weight of the container based upon an amount of liquid contained therein, a temperature value that may be influenced by the liquid contained therein, texture values corresponding to a glass-like bottom and a rubber top portion, color values corresponding to a transparent bottom portion and an orange top, a pose value to represent how the container is oriented relative to the rest of the virtual environment, and a location value that represents two or three dimensional values (such as coordinates).

At block 406, a property of the object in the real environment (e.g., the same object detected at block 402) may be presently sensed/detected. As discussed with respect to block 402, sensors may be utilized to detect objects in the real environment. In this embodiment, continuing with the container example, lidar sensors may detect the location and pose of the container. Tactile sensors, which may be included in/on the robot's arm and/or effectuator, may obtain data relating to the container's texture(s), temperature(s), and density (such as by squeezing or picking up the container). The container's color may be determined by a visual sensor, such as a camera. It should be noted that block 404 may be performed at any time (before, during, or after) with respect to blocks 402 and/or 406.

At block 408, a conflict may occur between the expected property and the presently-detected object property. In this embodiment, this may occur where one or more expected attributes do not match what the robot detects. For example, and as discussed in more detail below with respect to FIGS. 6A-C, the pose of an object's virtual representation may not match what the robot detects in the actual environment. Similarly, and as discussed in more detail with respect to FIGS. 7A-C, the weight of an object's virtual representation may not match what the robot detects when attempting to lift the real object.

At block 410, the expected object property may be updated based on the presently-detected property. This may occur, for example, as objects change over time such that the information in the virtual representation may become outdated. In this embodiment, attributes such an object's pose and/or weight may be updated based upon what is detected as the robot interacts with the object in the real environment.

Figure 5:
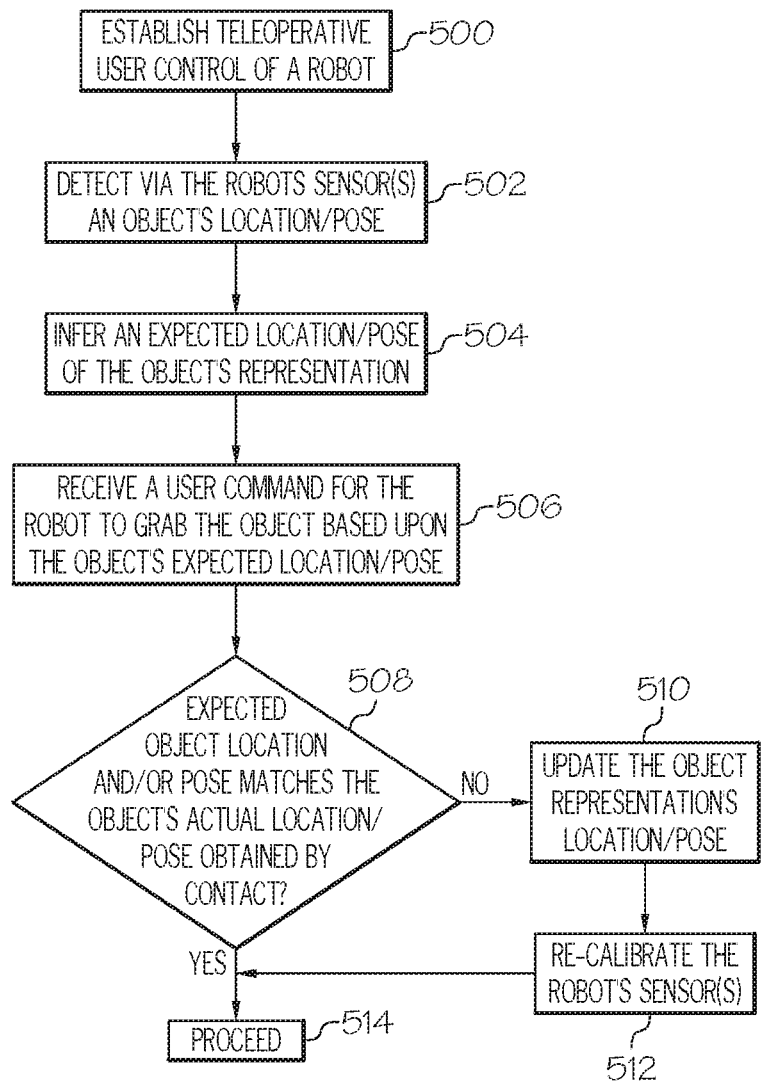
FIG. 5 illustrates a flowchart for updating a virtual object's expected property and recalibrating a sensor based upon a conflict between the detected location/pose of a detected object and the expected location/pose of the virtual object, according to one or more embodiments described and illustrated herein.

Turning to FIG. 5, a flowchart for updating an object's expected property and recalibrating a sensor based upon a conflict between the detected location/pose of an object and the expected location/pose of the object is presented, according to one embodiment. At block 500, the teleoperative user's control of the robot may be established along with an interface that may provide a virtual representation of the environment of the robot (e.g., in the manner as describe above with respect to block 400 of method 400). At block 502, the current location/pose of an object within the actual (i.e., real) environment may be detected by the robot's sensor(s). At block 504, one or more expected properties of the representation of the object detected at block 502 may be inferred or retrieved, which in this embodiment includes the pose and/or location with respect to the object's representation (i.e., a virtual object) within the virtual environment presented to the user. At block 506, a user command may be received that directs the robot in the virtual environment to grab the virtual object, based upon the expected location/pose of the virtual object. It should be noted that block 502 may be performed at any time (before, during, or after) with respect to blocks 504 and/or 506.

At block 508, a determination is made as to whether the virtual object's expected location and/or pose matches that of the detected object, where the detection may be based upon and/or obtained by the robot scanning and/or making physical contact with the object in the real environment. If the expected object location and/or pose match the detected object's actual location and/or pose (yes at block 508), then the flowchart proceeds to block 514 where the robot continues with its regular operations. Some embodiments may tolerate an error threshold in terms of accuracy (i.e., whether the mismatch is within a certain threshold of error) in proceeding to block 514 such that a match may be determined to exist if the actual location and/or pose are within an error threshold of the expected location and/or pose. In this embodiment, if the expected object location and/or pose does not match the actual location and/or pose of the detected object (no at block 508), then at block 510 the location and/or pose of the object's representation (i.e., virtual object) may be updated based upon the detected location and/or pose of the object in the actual environment. Based upon this updating of the object representation's location/pose, at block 512 the robot's sensor(s) may be recalibrated. For example, once a conflict has been determined between an object's expected location and the object's actual location, the difference in that distance may be utilized to update one or more sensors according to the conflict. The sensor's calibration may be updated (e.g., shifted vertically, horizontally, and the like) and the object may then be rescanned once the sensor has been updated in order to take the conflict into account. The sensor may continue to be recalibrated by rescanning the object and/or other objects until the conflict is eliminated or reduced below a threshold. Calibration may also be performed with respect to an object's pose. The flowchart then proceeds to block 514 where the robot resumes its regular operations.

Figure 6A:
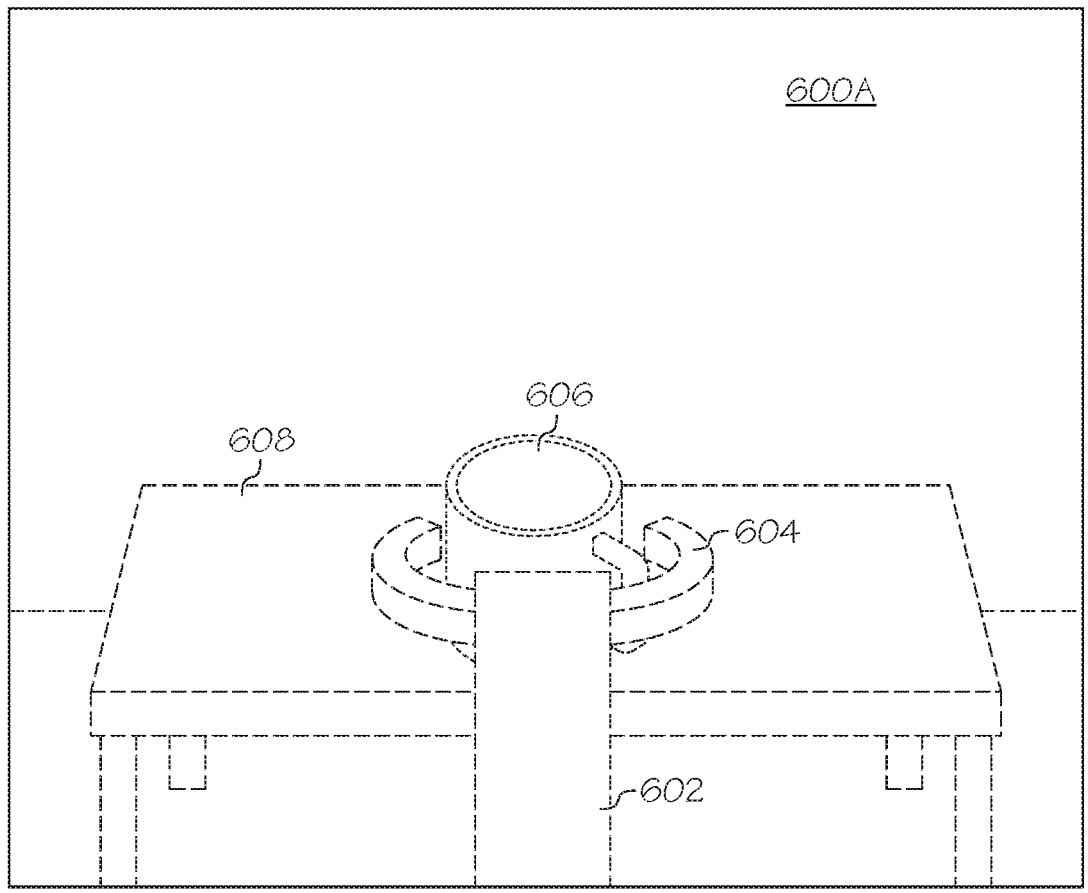
FIG. 6A illustrates a teleoperative first-person view of a virtual environment wherein a virtual robot prepares to manipulate a virtual object, according to one or more embodiments shown and described herein.

Turning to FIG. 6A, a teleoperative first-person view of a virtual environment 600A wherein a virtual effectuator 604 prepares to manipulate a virtual object 606 is presented, according to one embodiment. The virtual representation may be displayed on a display device of the interface device 180. Merely for differentiation purposes, the virtual environments depicted in FIGS. 6A-B and 7A-B are shown with dotted lines, whereas the corresponding actual environments depicted in FIGS. 6C and 7C are shown in solid lines. In this embodiment, the virtual effectuator 604, located at the distal end of a robot's virtual arm 602, prepares to grasp the virtual object 606 sitting upon a virtual table 608. Although depicted as a pincer, a virtual effectuator 604 may have any suitable configuration (such as a hand, claw, flat/pointed/curved surface, blade, tentacle, rod, an appendage, and the like) associated with the robot 100 that is capable of interacting with a virtual object 606. Although depicted here as a coffee cup, a virtual object 606 may be anything with which a robot 100 can interact. Here, the user teleoperatively controls the robot's virtual arm 602 and virtual effectuator 604 in an attempt to grasp the virtual object 606 residing on the virtual table 608.

Figure 6B:
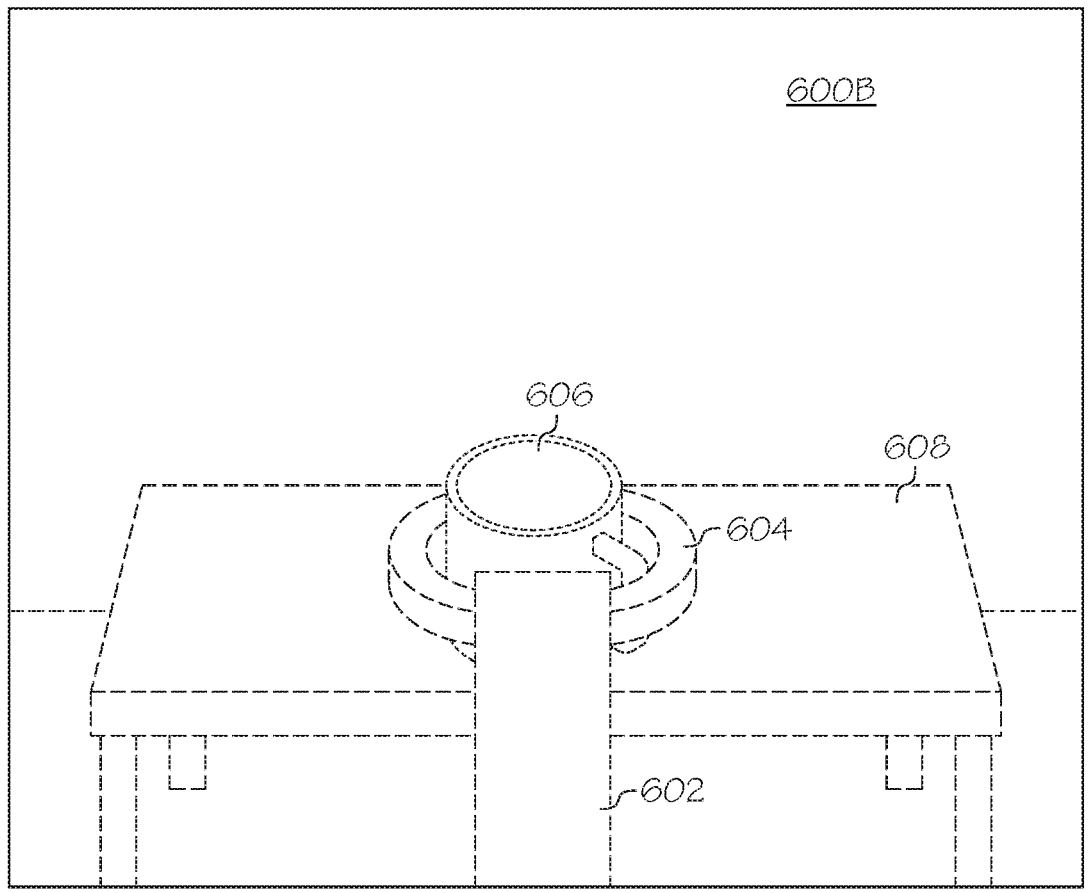
FIG. 6B illustrates a subsequent teleoperative first-person view of the virtual environment as the virtual robot manipulates the virtual object depicted in FIG. 6A, according to one or more embodiments shown and described herein.
Figure 6C:
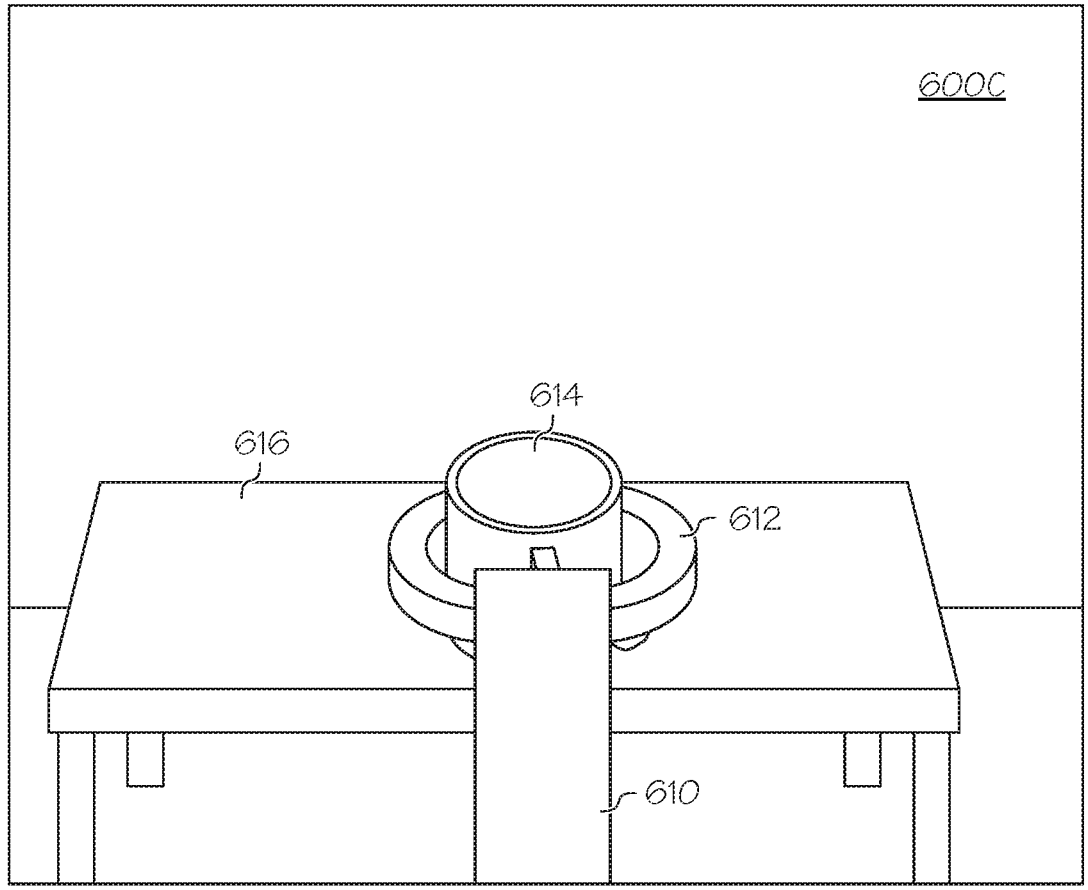
FIG. 6C illustrates a first-person view of the actual environment corresponding to the virtual environment depicted in FIG. 6B as the actual robot manipulates the actual object, according to one or more embodiments shown and described herein.

Turning to FIG. 6B, a subsequent teleoperative first-person view of the virtual environment 600B is presented wherein the robot's virtual effectuator 604 manipulates the virtual object 606 depicted in FIG. 6A, according to one embodiment. Here, the virtual effectuator 604 has grasped the virtual object 606 (i.e., the coffee cup).

Turning to FIG. 6C, a first-person view of the detected environment 600C corresponding to the virtual environment 600B depicted in FIG. 6B is presented as the detected effectuator 612 manipulates the detected object 614, according to one embodiment. In the detected (i.e., real) environment 600C, the detected effectuator 612 correspondingly manipulates the detected object 614. However, the pose of the detected object 614 in the detected environment 600C differs from that of the virtual object 606 in the virtual environment 600B (See FIG. 6B). In this instance, due to the configuration of the detected arm 610 and/or the detected effectuator 612, the detected object 614 is still successfully grasped despite this conflict. In another example, a different detected object 614, detected arm 610, and/or detected effectuator 612 may result in the detected object 614 not being successfully picked up, such that the detected object 614 may be inadvertently moved, knocked over, dropped, or otherwise be otherwise affected by the robot. In some embodiments, upon detecting a conflict, the robot may, for example, via its detected arm 610 and/or detected effectuator 612, utilize additional touching and/or visual detection to further explore the detected location and/or pose of the detected object 614. Once a conflict has been detected, the robot may report and/or otherwise update data associated with the virtual object 606 within the virtual environment 600B. Additionally, the location of the virtual table differs slightly (i.e., located slightly to the right) as compared to the detected table in the detected environment 600C. Although this conflict does not impact operation of the robot and/or the manipulation of the detected object 614, the location of the virtual table within the virtual environment 600B may nevertheless be updated. In some embodiments, the robot (such as its sensors) may be recalibrated immediately or later based upon the occurrence of one or more discrepancies.

Figure 7A:
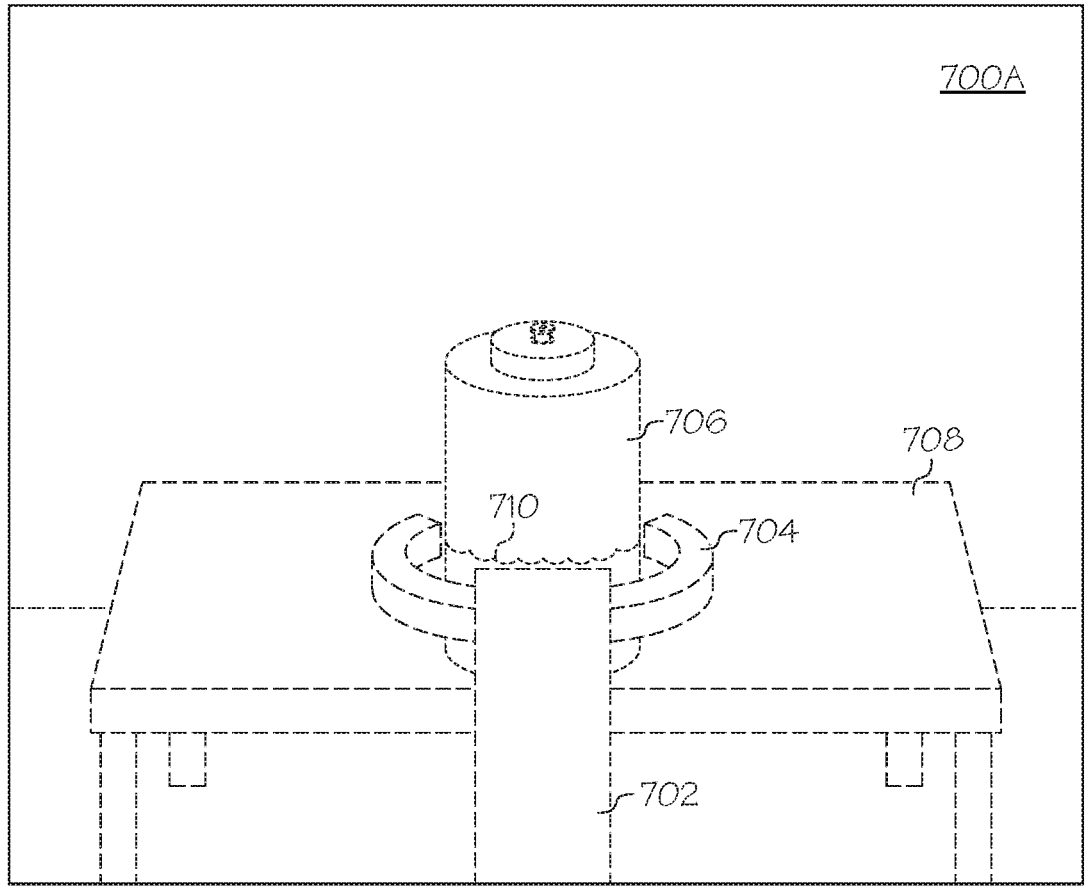
FIG. 7A illustrates a teleoperative first-person view of a virtual environment from a virtual robot preparing to manipulate a virtual object containing virtual liquid, according to one or more embodiments described and illustrated herein.

Turning to FIG. 7A, a teleoperative first-person view of a virtual environment 700A wherein a virtual effectuator 704 prepares to manipulate a virtual object 706 containing virtual liquid 710 is presented, according to one embodiment. Here, the user teleoperatively controls the robot's virtual arm 702 and virtual effectuator 704 to approach the virtual object 706 sitting upon a virtual table 708.

Figure 7B:
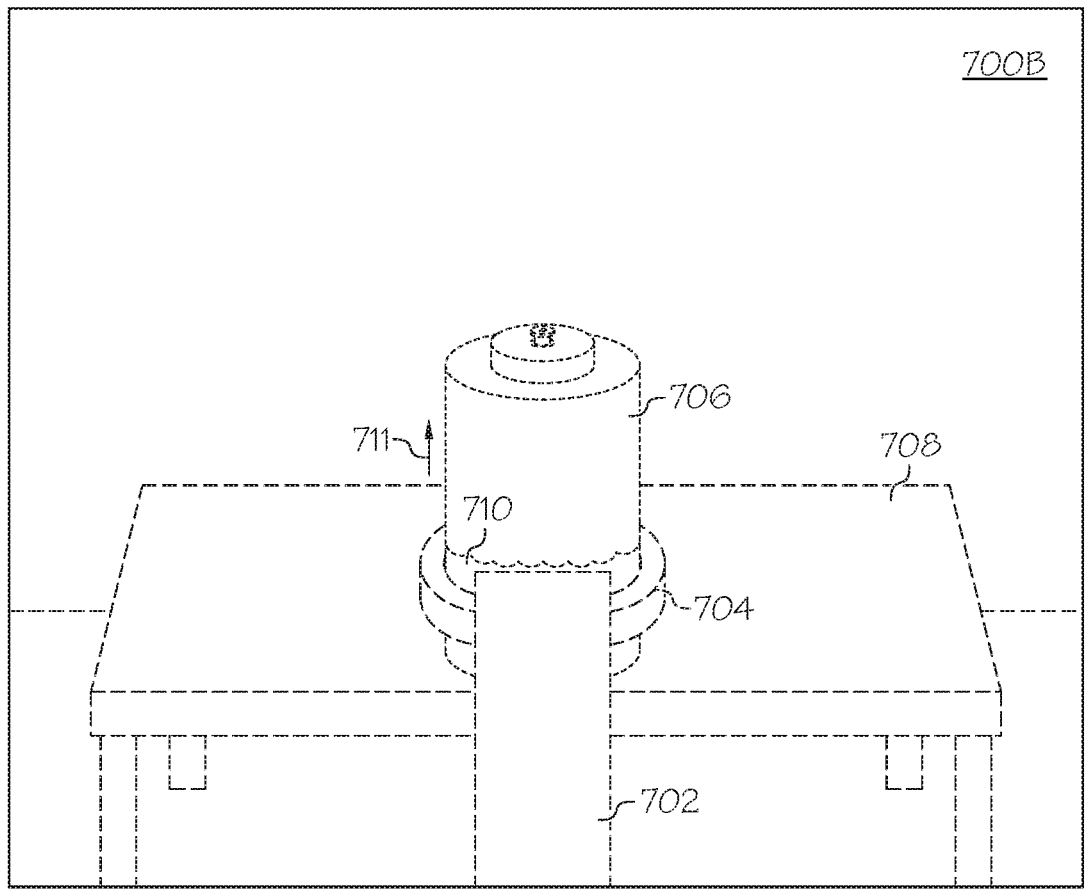
FIG. 7B illustrates a subsequent teleoperative first-person view of the virtual environment from the virtual robot manipulating the virtual object containing virtual liquid as depicted in FIG. 7A, according to one or more embodiments described and illustrated herein.
Figure 7C:
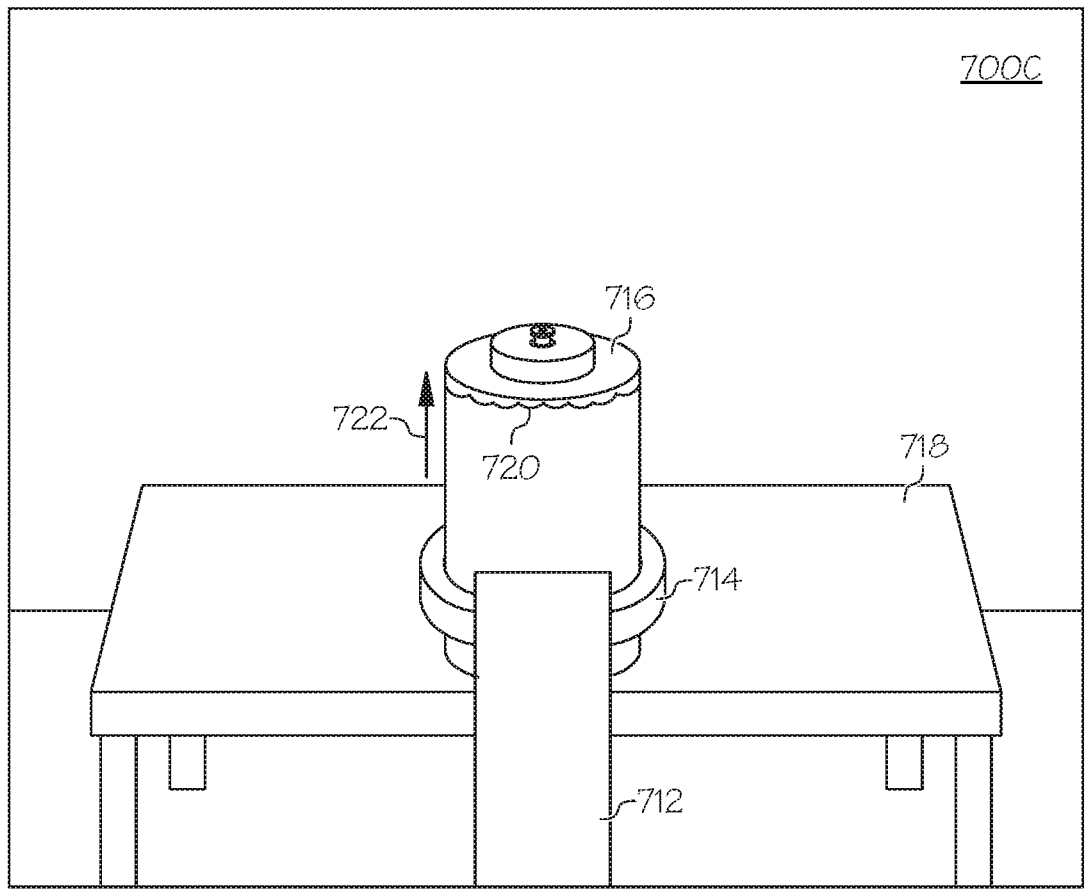
FIG. 7C illustrates a first-person view of the actual environment corresponding to the virtual environment depicted in FIG. 7B in which the actual robot manipulates the actual object containing a different amount of liquid, according to one or more embodiments described and illustrated herein.

Turning to FIG. 7B, a subsequent teleoperative first-person view of the virtual environment 700B is presented as the virtual effectuator 704 manipulates the virtual object 706 containing virtual liquid 710, as depicted in FIG. 7A, according to one embodiment. A virtual force indicator 711 may be displayed that provides an indication with an arrow representing the amount of force needed to lift the virtual object 706, although any suitable type of indicator (graphical, audio, and/or tactile) may be utilized to inform the user. In other embodiments, this may displayed as a weight value (pounds, grams, and the like). A threshold value may also be utilized to indicate that the robot cannot lift beyond a certain weight, such that lifting may not be provided as an option, or a warning may be provided to the user that attempting to lift the virtual object 706 could damage the robot and/or result in dropping the virtual object 706 and/or a corresponding detected object 716. In some embodiments, the virtual force indicator 711 may be presented prior to contact with the virtual object 706, such as when the virtual object 706 is displayed to the user within the virtual environment 700B. The virtual force indicator 711 may be presented when the user provides input that provides an indication of interest in the virtual environment 700B, such as keeping the view focused on the virtual object 706, moving towards it, and/or selecting it with an input mechanism such as an on-screen cursor.

Turning to FIG. 7C, a first-person view of the detected environment 700C corresponding to the virtual environment 700B depicted in FIG. 7B is depicted, according to one embodiment. The detected effectuator 714 may manipulate the corresponding detected object 716 containing a different amount of detected liquid 720 than the amount of virtual liquid 710 depicted in FIG. 7B. In this example, the detected force indicator 722 corresponds to the amount of force the robot must exert to lift the detected object 716 off of the detected table 718. Although a detected force indicator 722 corresponds to the virtual force indicator 711 depicted in FIG. 7B, there is a conflict due to the greater amount of detected liquid 720 than virtual liquid 710. The detected force indicator 722 is therefore represented by a larger arrow than virtual force indicator 711. This conflict may be utilized to update data associated with the virtual object 706, such as the values representing the amount of virtual liquid 710 and/or the weight of the virtual object 706.

Accordingly, embodiments of the present disclosure are directed to robots and systems that facilitate interaction with environments in which conflicts exist between the real environment of the robot and the virtual environment of the robot.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
   detecting an object in a real environment of a robot;
   inferring an expected amount of force needed for an effectuator of the robot to interact with the object based upon a representation of the object within a representation of the real environment of the robot;
   receiving user input directing the effectuator of the robot to interact with the representation of the object within the representation of the real environment of the robot;

sensing, via a sensor of the robot, a detected amount of force utilized for interaction of the effectuator of the robot with;

detecting a conflict between the expected amount of force for interaction with the object and the detected amount of force utilized for the effectuator of the robot to interact with the object, wherein the detected amount of force utilized differs from the expected amount of force;

updating, based on the conflict, an expected amount of force value based on the detected amount of force utilized; and adjusting an amount of force to apply to the object based on the conflict.

2. The method of claim 1 further comprising recalibrating a part of the robot based upon the conflict.

3. The method of claim 2 further comprising recalibrating the sensor based upon the conflict.

4. The method of claim 1 further comprising altering manipulation by the robot based on the conflict being detected through touch.

5. The method of claim 1 further comprising altering movement of the robot or manipulation by the robot based on the conflict being detected through touch.

6. The method of claim 1 further comprising scanning, via the robot, the real environment to update representation data pertaining to the representation of the object.

7. The method of claim 1 further comprising:
determining a threshold amount of force that can be exerted by the robot; and
displaying a warning that an amount of force to interact with the object exceeds the threshold amount.

8. A system comprising:
a robot comprising:
an effectuator; and
a sensor configured to output a signal; and
a processor configured to:
detect an object in a real environment of a robot based on the signal output by the sensor;
infer an expected amount of force needed for the effectuator of the robot to interact with the object based upon a representation of the object within a representation of the real environment of the robot;
receive user input directing the effectuator of the robot to interact with the representation of the object within the representation of the real environment of the robot;
sense, via the signal output by the sensor, a detected amount of force utilized for interaction of the effectuator of the robot with the object in the real environment;
detect a conflict between the expected amount of force for interaction with the object and the detected amount of force utilized for the effectuator of the robot to interact with the object, wherein the detected amount of force utilized differs from the expected amount of force;
update, based on the conflict, an expected amount of force value based on the detected amount of force utilized; and
adjust an amount of force to apply to the object based on the conflict.

9. The system of claim 8 wherein the processor is further configured to recalibrate a part of the robot based upon the conflict.

10. The system of claim 9 wherein the processor is further configured to recalibrate the sensor based upon the conflict.

11. The system of claim 8 wherein the processor is further configured to alter manipulation by the robot based on the conflict being detected through touch.

12. The system of claim 8 wherein the processor is further configured to alter movement by the robot based on the conflict being detected through touch.

13. The system of claim 8 wherein the robot is further configured to scan the environment to scan the real environment to update representation data pertaining to the representation of the object.

14. The system of claim 8 wherein the processor is further configured to:
determine a threshold amount of force that can be exerted by the robot; and
display a warning that an amount of force to interact with the object exceeds the threshold amount.

* * * * *